United States Patent
Fulton et al.

(10) Patent No.: US 9,914,624 B2
(45) Date of Patent: Mar. 13, 2018

(54) SYSTEMS AND METHODS FOR OBJECT GUIDANCE AND COLLISION AVOIDANCE

(71) Applicant: THE BOEING COMPANY, Chicago, IL (US)

(72) Inventors: Jonathan Fulton, Mt. Pleasant, SC (US); Whitney Loubier, Mt. Pleasant, SC (US); Shibin Mathew, Ladson, SC (US); Wei Mi, Summerville, SC (US); Andrew Pinion, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/189,779

(22) Filed: Jun. 22, 2016

(65) Prior Publication Data

US 2017/0369288 A1 Dec. 28, 2017

(51) Int. Cl.
*B66B 15/04* (2006.01)
*B66C 17/04* (2006.01)
*B66C 13/48* (2006.01)
*B66C 13/46* (2006.01)
*B66C 15/04* (2006.01)
*B60W 30/095* (2012.01)

(52) U.S. Cl.
CPC .............. *B66C 15/04* (2013.01); *B66C 13/46* (2013.01); *B66C 13/48* (2013.01); *B66C 17/04* (2013.01); *B60W 30/095* (2013.01)

(58) Field of Classification Search
CPC ......... B66C 15/04; B66C 17/04; B66C 13/48; B66C 13/46; B60W 30/095
USPC ....................................................... 701/301
See application file for complete search history.

(56) References Cited

U.S. PATENT DOCUMENTS

| | | | | |
|---|---|---|---|---|
| 5,359,542 A | * | 10/1994 | Pahmeier | B25J 9/1615 356/621 |
| 6,065,619 A | * | 5/2000 | Miyata | B66C 13/48 212/270 |
| 7,232,236 B2 | | 6/2007 | Vitense et al. | |
| 9,302,890 B1 | * | 4/2016 | Vogt | B66C 13/48 |
| 9,342,989 B2 | * | 5/2016 | Brommer | G08G 9/02 |
| 9,773,337 B2 | * | 9/2017 | Delplace | G06T 13/20 |
| 2004/0164041 A1 | * | 8/2004 | Sawodny | B66C 13/063 212/273 |

(Continued)

OTHER PUBLICATIONS

"Collision Avoidance Systems;" MH165_Collision Avoidance Brochure; 2015; Magnetek Material Handling.

*Primary Examiner* — Krishnan Ramesh
(74) *Attorney, Agent, or Firm* — Toler Law Group, PC (57) ABSTRACT

Systems and methods for object guidance and collision avoidance are provided. One system includes a location sensor disposed on a movable crane. The system also includes a plurality of sensors disposed on a plurality of objects within a facility. The system further includes a controller having a receiver for monitoring signals transmitted from the location sensor disposed on a movable crane and the plurality of sensors disposed on a plurality of objects within the facility. The controller is configured to generate a travel path for the movable crane to move an object coupled with the movable crane based on the one or more intersection regions and generate an output signal to an alarm device to provide an alert, when at least one object of the plurality of objects is within a predetermined proximity of at least the object being moved by the crane.

20 Claims, 7 Drawing Sheets

(56) References Cited

U.S. PATENT DOCUMENTS

| | | | | |
|---|---|---|---|---|
| 2010/0070179 A1* | 3/2010 | Cameron | ............... | G01S 5/0027 701/301 |
| 2010/0243593 A1* | 9/2010 | King | ....................... | B66C 13/46 212/276 |
| 2011/0076130 A1* | 3/2011 | Stocker | ................... | B66C 13/46 414/815 |
| 2012/0179305 A1* | 7/2012 | Kim | ....................... | B66C 13/48 701/2 |
| 2013/0299440 A1* | 11/2013 | Hermann | ................ | B66C 13/46 212/276 |
| 2013/0345857 A1* | 12/2013 | Lee | .......................... | G01S 5/16 700/229 |
| 2015/0012188 A1* | 1/2015 | Scheider | ................ | B66C 13/18 701/50 |
| 2016/0035120 A1* | 2/2016 | Delplace | ................ | G06T 13/20 345/473 |
| 2016/0247067 A1* | 8/2016 | Cai | ........................ | G06Q 10/00 |

* cited by examiner

SYSTEMS AND METHODS FOR OBJECT GUIDANCE AND COLLISION AVOIDANCE

BACKGROUND

The present disclosure relates in general to systems and methods for object guidance and collision avoidance, particularly crane guidance in a factory or large building environment.

Cranes, forklift trucks, automated equipment, robots, and other hazards within a building, such as a factory, can have a direct impact on the health and safety of individuals within the building. Environments with a high-density of large parts, tooling, and assembly equipment pose a particularly difficult safety challenge because of the associated momentum of the larger objects, which can lead to potential near misses with individuals or other objects in the building, and in some cases, could result in impact with the individuals or other objects.

For example, in factories, such as for the manufacture of aircraft, an overhead crane move is planned on a case by case basis due to the dynamic location of equipment and people on the floor. As the crane moves to a location to pick up an item, the crane may come in contact with a number of items that can create a potential collision. In these settings, a significant amount of man power is needed to spot and guide the crane to and from certain locations, shutting down areas that may not need to be shut down or shutting down an area for longer than necessary.

Moreover, human reaction time is limited by the human speed to process the warnings and complexity of things known and things that can be seen and heard. This process is challenging, for example, in a factory environment due to noise reduction devices (e.g., ear plugs, music headphones, etc.) and also limited by line-of-sight threats.

Thus, individuals who work in manufacturing facilities, industrial yards, warehouses, and outdoor storage facilities in the proximity of industrial equipment are challenged with daily safety concerns. It would be desirable to provide efficient guidance when moving objects and to identify and warn individuals of potential conditions that could result in impact of the individual with the moving objects.

SUMMARY

In various embodiments, a system for object guidance and collision avoidance is provided. The system includes a location sensor disposed on a movable crane, wherein the location sensor is configured to transmit signals including a location of a portion of the movable crane. The system also includes a plurality of sensors disposed on a plurality of objects within a facility, wherein the plurality of sensors are configured to transmit signals including the location of at least a portion of the object on which the sensor is disposed. The system further includes a controller having a receiver for monitoring the signals transmitted from the location sensor disposed on a movable crane and the plurality of sensors disposed on a plurality of objects within the facility. The controller is configured to determine a direction of travel of the movable crane based on location sensor data over time from the signals, and to determine one or more intersection regions of the direction of travel of the crane relative to at least one object of the plurality of objects. The controller is further configured to generate a travel path for the movable crane to move an object coupled with the movable crane based on the one or more intersection regions and generate an output signal to an alarm device to provide an alert, when at least one object of the plurality of objects is within a predetermined proximity of at least the object being moved by the crane.

In various embodiments, a method for object guidance and collision avoidance is provided. The method includes transmitting, from a location sensor disposed on a movable crane, signals including a location of at a portion of the movable crane moving an object and transmitting, via a plurality of sensors on a plurality of objects in a facility wherein the crane is moving, signals including a location of the object on which each sensor is disposed. The method further includes monitoring, via a controller, signals from the location sensor and plurality of sensors and determining, via the controller, a direction of travel of the movable crane and an intersection region of the direction of travel of the crane relative to at least one of the plurality of objects. The method additionally includes generating a travel path for the movable crane to move an object coupled with the movable crane based on the one or more intersection regions and generating an output signal to an alarm device to provide an alert, when at least one of the plurality of objects is within a predetermined proximity of the object being moved by the movable crane, to thereby alert an operator of the crane to enable collision avoidance with the at least one object.

In various embodiments, a smart overhead crane is provided. The smart overhead crane includes a hook for supporting an object to be moved within a facility and a safety range sensor coupled to the hook. The smart overhead crane further includes a controller having a receiver for monitoring signals transmitted from the safety range sensor and a plurality of location sensors disposed on a plurality of objects within the facility that are configured to transmit location information to the receiver. The controller is configured to generate a travel path for the hook to move the object based on the location information and generate an output signal to an alarm device to provide an alert, when at least one object of the plurality of objects is within a safety range of the hook as determined by the safety range sensor.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

Various embodiments provide systems and methods for object guidance and/or collision avoidance, particularly dynamic route planning and anticipatory collision avoidance. More specifically, the systems and methods described herein include a plurality of sensors for use in dynamic guidance planning and inhibiting or preventing collision between objects in a facility. Thus, the systems and methods may be configured as a real-time safety monitoring and guidance system for a factory environment, which may include, for example, a "smart" crane.

One or more systems can include one or more devices that can be disposed on (e.g., coupled to) moving objects in a factory (e.g., cranes, forklift trucks, etc.), such as by providing a bolt-on or other coupling capability moving objects in the factory (and non-moving objects). The devices are then operated to provide route planning, dynamic guidance and safety monitoring, including anticipatory collision avoidance, such as to improve the welfare of people within the factory. In some embodiments, the system provides the capability for dynamic alerts based on potential detected collisions.

A technical effect of one or more embodiments is the ability to determine tooling and equipment locations that require movement or interfere with movement performed by an overhead crane while maintaining a safe work environment by using a system of sensors, readers, and/or hardware within the facility that also integrates with the overhead crane. Another technical effect of one or more embodiments is the optimization of a current scheduling of a crane, as well as providing feedback to the crane operator (or other people on the floor) to reduce or minimize potential collisions in moving an object from one location to another. For example, in some embodiments, the systems described herein are configured to shut down the operation of the crane in the event of a collision or potential collision or change a travel route or path.

In operation, various embodiments utilize one or more, or a combination of positioning technology (e.g., radiofrequency identification (RFID) or GPS technology), sensor technology, route planning systems/software, collision avoidance systems/software, and feedback technology that may include light, sound, and vibration. The various embodiments are configured to provide dynamic guidance, safety monitoring and warnings to potentially affected individuals or identified individuals that a potentially dangerous situation is anticipated and to increase situational awareness.

Thus, as described in more detail below, various embodiments provide a real-time route planning and guidance system, such as for crane operation, which also includes safety monitoring for anticipatory collision avoidance. For example, one or more embodiments can provide dynamic crane route guidance that reduces the likelihood of possible collision with an object being moved, as well as providing safety morning in combination with a warning system having the ability to alert individuals (e.g., employees) of potential conditions or scenarios that are not in the line-of-site of the individuals. Accordingly, the ability to pre-plan a route, dynamically change the route, and sense and anticipate potential collisions is provided with the ability to notify of a potential dangerous condition (e.g., imminent collision).

By practicing one or more embodiments, real-time or "smart" guidance and warning is provided that aids in dynamic route planning and the safety of individuals by providing a preferred or optimized route and anticipating and avoiding collisions in factory/shop environments, industrial yards, and warehouses, among other environments and settings. For example, various embodiments, reduce the likelihood and/or anticipate collision of two objects hitting that might not have line-of-sight, which in various embodiments includes changing the route guidance or plan and anticipating a potential collision based on one or more factors, including position information, physical force information and movement information.

It should be noted that while one or more embodiments may be described in connection with a particular environment, the embodiment(s) may be implemented or used in different environments. For example, one or more systems and methods described herein may be used in different manufacturing environments (e.g., aerospace, automotive, industrial plants), industrial warehouses (including forklifts, racks, and having poor visibility), industrial yards (having heavy equipment, trucks and forklifts) and outdoor storage areas (e.g., in airports, shipping docks, and automotive facilities), among others. For example, systems and methods described herein may be used for guidance planning and collision avoidance in high-density factory environments or other complex factory environments.

Figure 1:
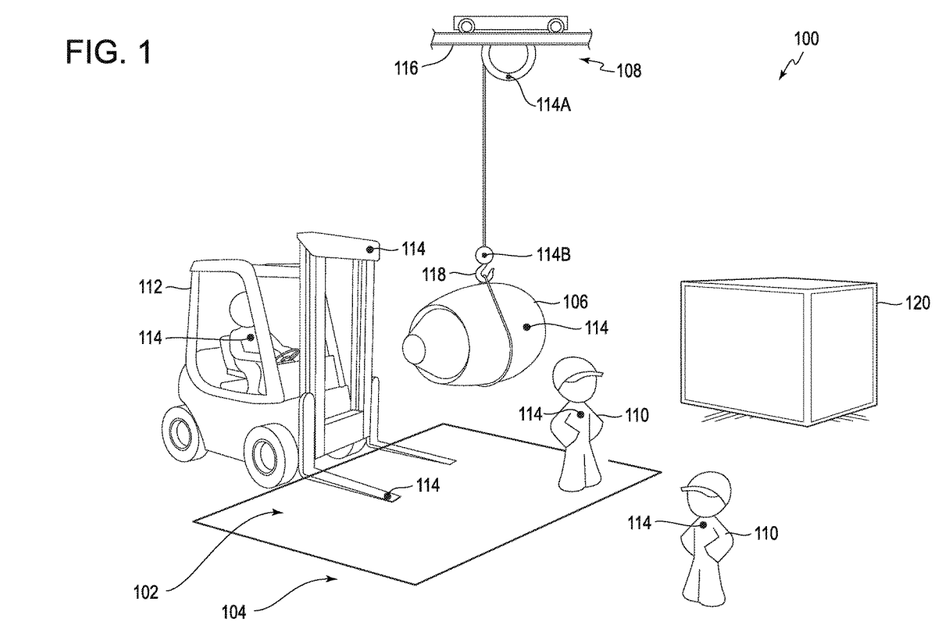
FIG. 1 is a diagram of an object guidance and collision avoidance system.

As illustrated in FIG. 1, an object guidance and collision avoidance system 100 is configured as a dynamic or "smart" route guidance and collision avoidance system. In the illustrated embodiment, the object guidance and collision avoidance system 100 operates to provide dynamic route guidance and limit object movement or provide warnings within one or more areas 102 and 104 of potential collision between a moving object 106 (illustrated as an engine being moved by an overhead crane 108) and one or more individuals 110 moving/operating equipment. For example, objects or the individuals 110 may be working within the areas 102 and 104, including walking within the areas 102 and 104 or operating equipment, such as a forklift 112 that is within or may be heading towards one of the areas 102 and 104. The object guidance and collision avoidance system 100 provides guidance information and planning (which may include feedback to the operator of the overhead crane 108) to facilitate moving the object 106 and avoiding or anticipating a possible collision within different areas, which may include providing warnings relative to large moving objects (having large inertia that can take some effort and time to slow down), which may also not be within the line-of-sight of the individuals 110. For example, the active or dynamic guidance is provided by the overhead crane 108 that is configured as a "smart" crane that operates to move the object 106, while avoiding other objects (such as the forklift 112 or a large container 120) and individuals 110. The object guidance and collision avoidance system 100 may include providing warnings in situations even when the individuals 110 see the object 106, but might otherwise not be able to avoid impact with the object 106 without collision avoidance and guidance by the object guidance and collision avoidance system 100. Thus, the object guidance and collision avoidance system 100 provides dynamic route guidance and anticipatory collision avoidance with respect to individuals 110 that are paying attention and individuals 110 that are not paying attention to their surrounding environment.

The areas 102 and 104 are determined by the object guidance and collision avoidance system 100 as potential zones of concern or potential collision. The areas 102 and 104 may be determined to have different degrees of relative likelihood of potential collision, such that in the area 102 potential collision is greater than in the area 104. As such, different warnings (e.g., visual, tactile or audible warnings) may be provided based on the potential collision likelihood. For example, in the area 102 having a higher likelihood of potential collision, a high alert or warning may be provided, while in the area 104 having a lower likelihood of potential collision than the area 102, a lower alert or caution may be provided.

In the illustrated embodiment, the object guidance and collision avoidance system 100 is configured to facilitate guidance for moving the object 106 (e.g., to prevent collision between the movable overhead crane 108 and a plurality of objects in a facility) and includes one or more location sensors 114 disposed on the movable crane 108. It should be noted that while two location sensors 114 are shown disposed on the crane 108 (with one location sensor 114a being on a top portion of the crane 108 and one location sensor 114b being at an end portion of the crane 108) and one location sensor 114 disposed on the objects and individuals 110 in FIG. 1, additional or fewer location sensors 114 may be provided in connection with the crane 108 and at different positions as desired or needed. The location sensors 114 may be any type of device capable of transmitting a location of the location sensor 114 (e.g., an RFID device or range sensor as described herein). For example, the location sensors 114 can be individually identified and transmit signals indicative of the location of the object or individual to which the location sensor 114 is disposed or coupled.

Thus, the object guidance and collision avoidance system 100 includes one or more location sensors 114 disposed on a plurality of objects within the facility, such as coupled with the object 106 being moved, the forklift 112 and/or the individuals 110 within the facility. The location sensors 114 are configured to transmit signals including the location of the objects or individuals, including, for example, the location of an elevated portion of an object on which the location sensor 114 is disposed.

In operation, and in one embodiment, the object guidance and collision avoidance system 100 is configured to actively determine the x,y,z location of the bridge 116 and the hook 118 of the overhead crane 108 through the use of a combination of location sensors 114, such as using safety range detection technology and/or active RFID technology. For example, the one or more location sensors 114 may be embodied as or include one or more active RFID tags, which may be detected and the location of which determined using RFID reader technology. Using the combination of location information from the location sensors 114, the object guidance and collision avoidance system 100 is configured to account for any physical forces or movements on the entire crane system of the overhead crane system 108. The object guidance and collision avoidance system 100 also can be configured to consider parameters that account for the height and/or location of various tooling and/or parts within the facility that are able to communicate with the hook 118. The object guidance and collision avoidance system 100 is, thus, configured to determine the difference between the locations of potential collision points to not only the crane 108, but the hook 118 of the crane 108, thereby allowing the operator of the crane 108 to navigate safely and efficiently through the facility. In various embodiments, one or more fields (e.g., the one or more areas 102 and 104) are set around potential collision locations or points on the floor that when entered by the hook 118 of the crane 108, will immediately shut down the crane 108 prior to collision.

Figure 2:
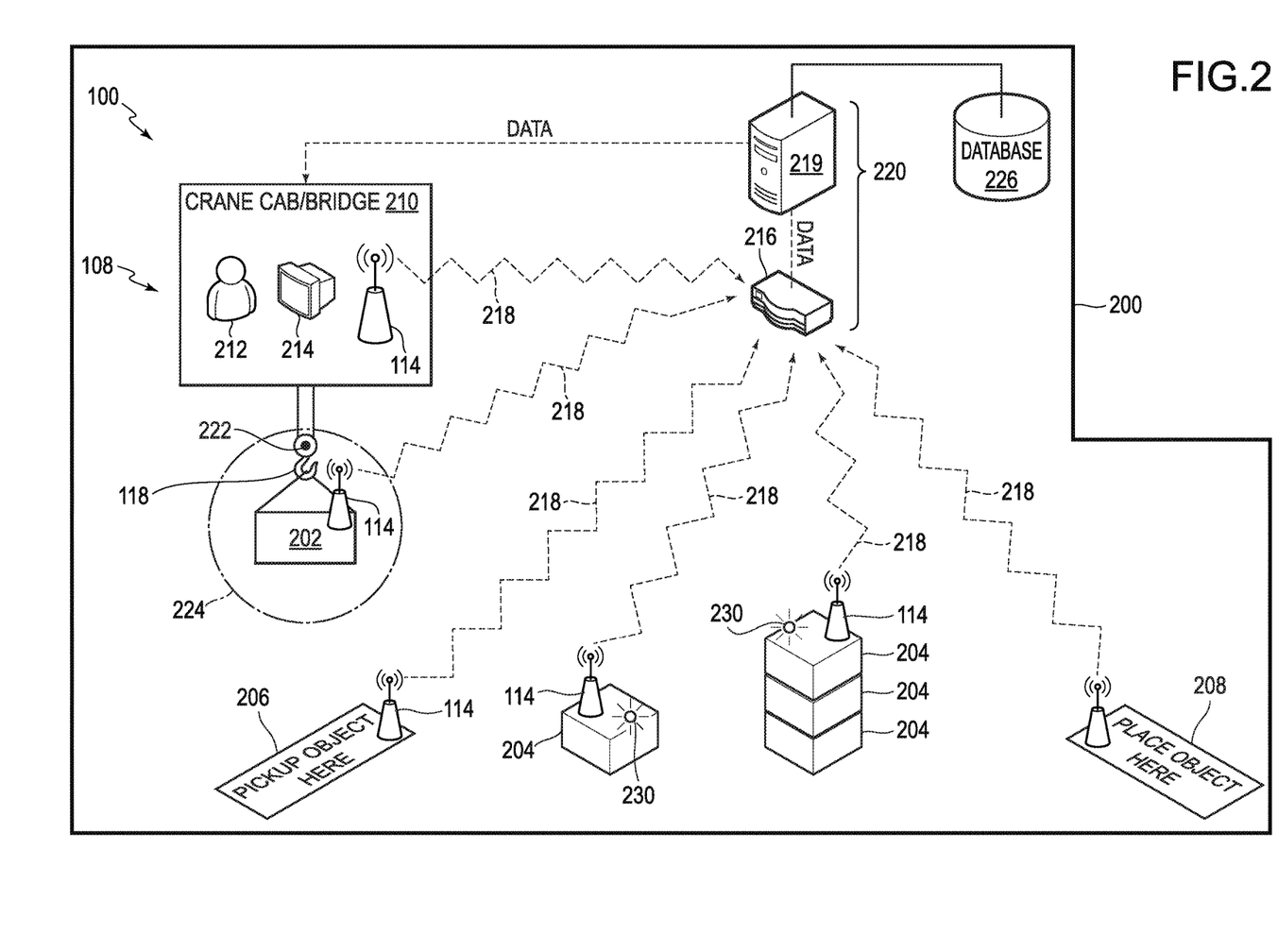
FIG. 2 is another diagram of an object guidance and collision avoidance system.

FIG. 2 is an illustration of a working example of the object guidance and collision avoidance system 100. As can be seen in FIG. 2, the location sensors 114 are placed throughout the facility 200, including on moving and non-moving objects. For example, in the illustrated embodiment, the location sensors 114 are positioned on (e.g., disposed or coupled on) an object 202 being moved, a plurality of objects 204 within the facility 200 (it should be noted that the objects may have different heights or be stacked to different heights), a location 206 where the object 202 is picked up, a location 208 where the object is to be moved to or placed, the hook 118 of the crane 108 and within the crane cab/bridge 210 (which is where the crane operator 212 and crane control system 214 are located). In this embodiment, the location sensors 114 are RFID transmitters or tags. However, different types of location sensors 114 using different technologies may be used. For example, in the illustrated embodiment, the location sensor 114 coupled with the hook 118 is a safety range sensor, such as a photoelectric sensor 222 (one or more may be provided) that defines a crane hook safe operating area 224, which is a safe operating radius (e.g., 50 feet) around the hook 118 (factoring in the size and weight of the object 202 in various embodiments). In various embodiments, the photoelectric sensor(s) 222 are any device(s) that are capable of determining the distance, absence, or presence of an object within a detection distance (such as within crane hook safe operating area 224) by using a light transmitter, such as an infrared transmitter, and a photoelectric receiver. It should be appreciated that the safety range sensor may be embodied as other types of sensing devices, using different types of distance sensing technology, such as camera imaging or three-dimensional (3D) imaging, or different types of range finding technology.

The object guidance and collision avoidance system 100 further includes at least one receiver 216 (e.g., RFID receiver or other wireless receiver), which may be any device capable of receiving wireless signals 218 (e.g., RFID signals) from the location sensors 114. For example, in one embodiment, the receiver 216 is an RFID reader that receives RFID signals (e.g., location signals) transmitted from the location sensors 114, configured as active RFID devices. The receiver 216 in various embodiments is also configured to receive signals from the photoelectric sensor 222, which may be used to identify potential objects that may be in a location for a possible collision with the object 202.

The receiver 216 may be communicatively coupled with or form part of a controller 220 of the object guidance and collision avoidance system 100. The controller 220 may be embodied as or include a processing device 219 (e.g., a CPU), which when programmed to perform dynamic guidance and/or collision avoidance as discussed herein is specialized hardware. In some embodiments, the controller 220 having the receiver 216 is configured to receive and monitor the wireless signals 218 from the location sensors 114 and the photoelectric sensor(s) 222. However, it should be appreciated that in some embodiments, the location or safety range information may be transmitted and received optionally or additionally by the crane control system 214.

The controller 220 in various embodiments is further configured to determine a direction of travel of the movable crane 108 based on location data over time (e.g., location signals received from the location sensors 114 on the hook 118 of the crane 108) and to determine an intersection region (such as a potential collision area) of the direction of travel of the crane 108 relative to at least one of the plurality of objects 204. For example, in some embodiments, the processing device 218 accesses a database 226 that includes stored information regarding the dimensions of the object 202 being moved, as well as the other objects within the facility 200. For example, the database 226 in various embodiments includes specific information regarding each of the objects, such as the dimensions of the object, position of the location sensor 114 on the object, the orientation of the object, etc.

Figure 3:
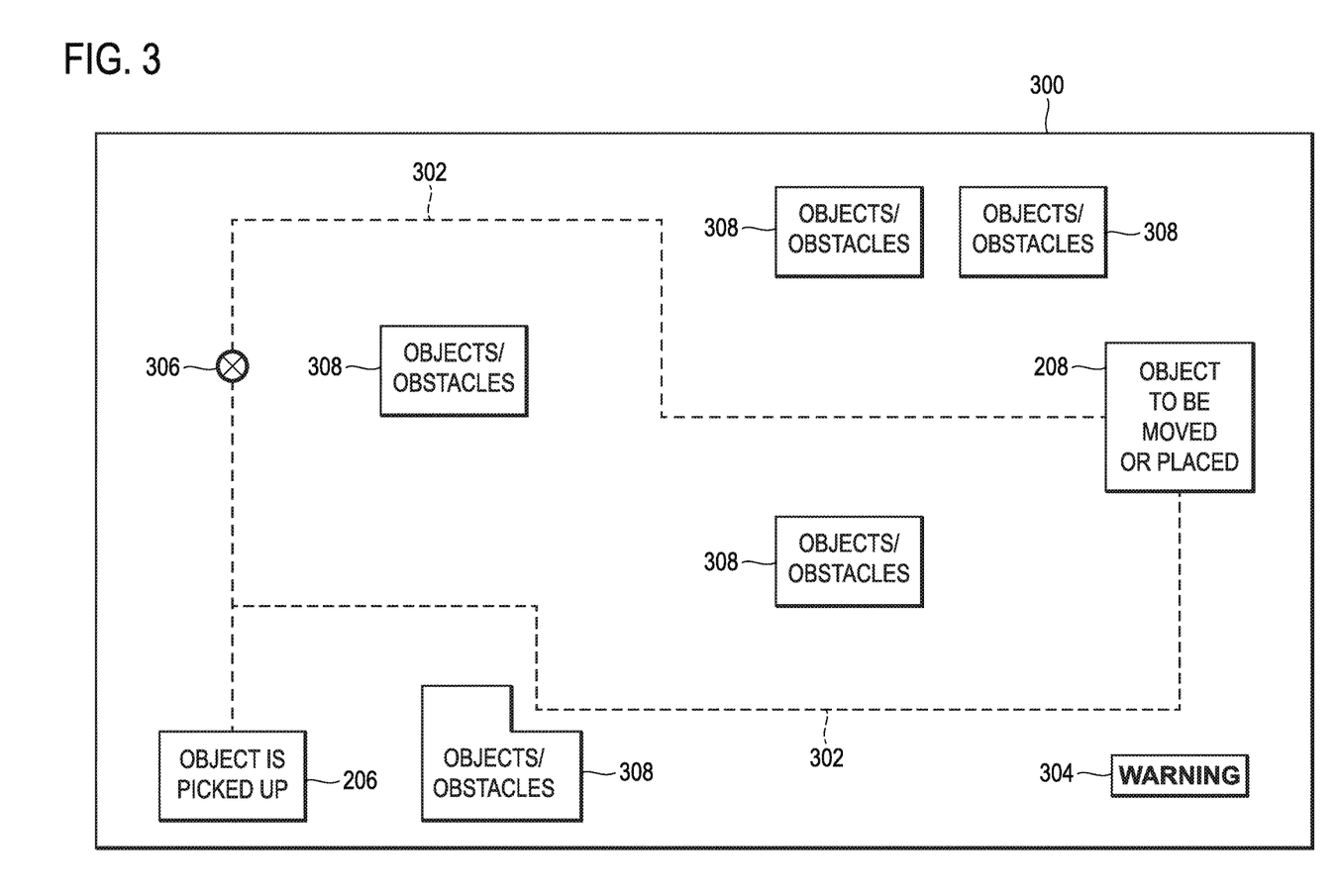
FIG. 3 is a diagram of a display of an object guidance and collision avoidance system.

In operation, using this information, the controller 220 can provide to the crane control system 214 information relating to a preferred route of travel for movement of the object 202, which may also identify alternate routes in the event, for example, that an unexpected object is detected. For example, the controller 220 may provide guidance information to the control system 214 for display that shows the preferred route and detected objects within the facility 200. In some embodiments, a display 300 (e.g., a screen of the crane control system 214) is provided as shown in FIG. 3 that shows the operator 212 possible travel routes 302 for moving the object 202 from the location 206 where the object 202 is picked up to the location 208 where the object is to be moved to or placed. The display 300 also shows areas 308 that include objects or other obstacles (such as based on location information from the location sensors 114), which may be updated if the objects or other obstacles move. For example, in a dynamic setting where there is movement within the facility 200, the areas 308, which are areas to be avoided may change based on updated location data. In this case, the controller 220 may calculate one or more different travel routes 302 for moving the object 202 to avoid a possible collision with one or more objects 204 and to facilitate a more efficient and faster movement of the object from the location 206 where the object 202 is picked up to the location 208 where the object is to be moved to or placed.

In various embodiments, the controller 220 is further configured to generate an output signal to an alarm device (e.g., speaker or display indicia) to provide an audible or visible alert, when at least one of the plurality of objects 204 is within a predetermined proximity of at least the end portion of the movable crane 108, such as within the hook safe operating area 224 as determined based on location information from the locations sensors one the crane 108 and the objects. For example, a warning indicator 304 may be displayed on the display 300 to alert the operator 212 of the potential collision condition and to enable collision avoidance with the at least one object. It should be noted that the display 300 may also display a current location 306 of the object 202 to allow the operator 212 to track and view the real-time movement of the object 202 within the facility 200.

Additionally, different visual or audible alerts may be provided. For example, an illuminating device for emitting a flashing illuminating indicia at the intersection region with the at least one object may be provided. In the illustrated embodiment, the illuminating device may be at least one light emitting device 230 disposed proximate to an elevated portion of one or more of the objects 204 on which the location sensor 114 is disposed (see FIG. 2) for illuminating the object 204 in response to the output signal to thereby provide a warning indicia to alert the operator 212 to enable collision avoidance with the at least one object 204.

Thus, in various embodiments, the object guidance and collision avoidance system 100 is configured as a system for inhibiting or reducing the likelihood of collision between the movable crane 208 and objects (including individuals 110) in the facility 200 using dynamic guidance and anticipatory collision avoidance. The object guidance and collision avoidance system 100 uses location information from the location sensors 114 included on the crane 108 and the objects 120, 202, 204 or individuals 110 to determine the location of the crane 108 and the objects 120, 202, 204 and individuals 110.

For example, the location information may include the location of an elevated portion of one or more of the objects 120, 202, 204 to determine whether the moving height of the object 202 on the hook 118 of the crane 208 may collide or impact with the objects 120, 202, 204 along the current travel path. As described herein, the travel path may be defined or changed based on the location of the crane 208 relative to the objects 120, 202, 204. For example, the direction of travel of the crane 208 or the height of the hook 118 may be changed based on a pre-planned travel path or based on changing conditions within the facility 200 (e.g., an object that moves within the pre-planned travel path).

As such, real-time guidance and warning is provided that aids the safety of individuals 110 and objects within the facility 200 and solves the problem of trying to anticipate and avoid collisions in factory/shop environments, industrial yards, and warehouses, among other facilities 200. For example, the object guidance and collision avoidance system 100 may provide crane guidance optimization and safety monitoring to prevent or reduce the likelihood that the object 106, 202 being moved may collide with objects or individuals 110 within the facility 200, such as other cranes, forklift trucks 112, automated equipment, robots, and other hazards can have a direct impact on health and safety within the facility 200.

Figure 4:
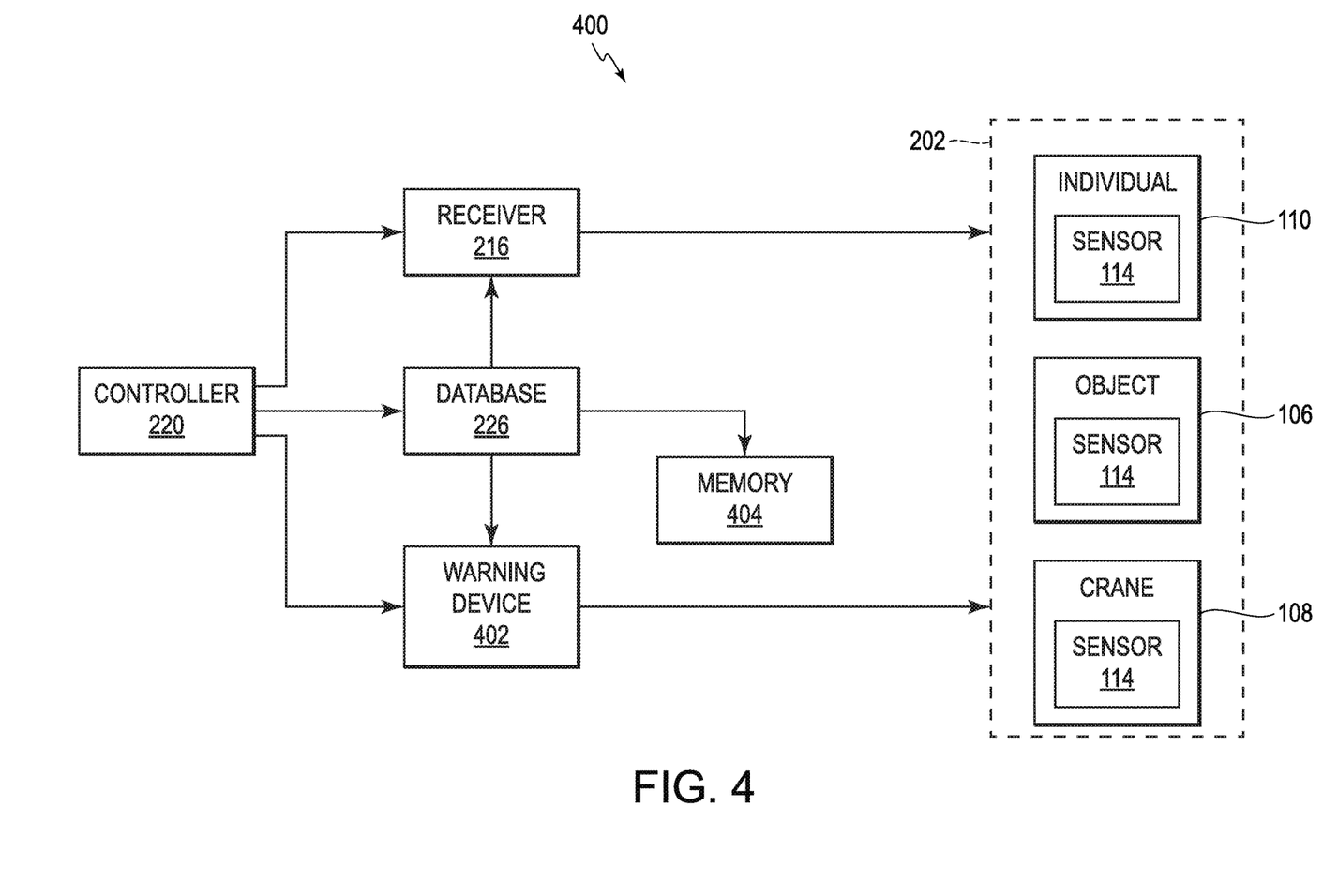
FIG. 4 is a block diagram of a crane guidance optimization and safety monitoring system.

In various embodiments, the object guidance and collision avoidance system 100 may be embodied as a crane guidance optimization and safety monitoring system 400 as shown in FIG. 4. It should be noted that like numerals represent like parts in the various Figures. The crane guidance optimization and safety monitoring system 400 may use location and object information as described herein, including one or more factors of the moving crane 108, moving object 106 and the individuals 110, such as the direction of travel and speed of each to determine and change a route of travel of the object 106, 202 based on the determined location of the objects 120, 202, 204, while performing safety monitoring to detect when the object 106, 202 being moved by the crane 108 may contact one or more of the objects 120, 202, 204, which may have moved after the travel route was planned. Thus, the object guidance and collision avoidance system 100 embodied as the crane guidance optimization and safety monitoring system 400 can inhibit, prevent or reduce the likelihood of collision between a plurality of objects in the facility 200 (including at least one movable or moving object) by planning a travel route and dynamically changing the travel route or halting the travel based on changing or unexpected conditions within the facility 200.

The crane guidance optimization and safety monitoring system 400 includes plural location sensors 114 respectively disposed on a plurality of movable objects or individuals within the facility 202, as well as on the crane 108. The location sensors 114 may be removably coupled or fixedly coupled to the objects, individuals 110 and/or crane 108. As discussed herein, the plurality location sensors 114 are each configured to wirelessly transmit signals including or indicating the location of the object, individual 110 or crane 108 on which the location sensor is disposed. For example, in some embodiments, the location sensors 114 include RFID or photoelectric sensor technology for use in determining location information. Different technologies may be used, such as imaging technology or GPS technology.

The crane guidance optimization and safety monitoring system 400 includes the controller 220 coupled with the receiver 216 (e.g., one or more wireless receivers). The controller 220 may be or include the processing device 218 or other processor (e.g., CPU) that is configured in one or more embodiments to monitor signals from the location sensors 114 and locations of the objects (e.g., objects 106 and individuals 110) to determine a direction of travel of each movable object based on each movable object's location over time (as well as the direction of travel of the crane 108). In operation, the controller 220 is configured to determine possible collision points or areas. For example, the controller 220 is configured to determine an intersection region (such as the areas 102 and 104 shown in FIG. 1) of the direction of travel of at least two movable objects (e.g., the object 106, 202 being moved by the crane and one or more of the objects 120, 202, 204) and dynamically identify a new travel path for the crane 108 or generate an output signal via a warning device 402 to provide a visible alert (and or an audible or tactile alert with other alert devices) at the intersection region of the at least two movable objects, when at least one movable object is within a predetermined proximity of the intersection region (e.g., within the crane hook safe operating area 224). Thus, an alert, for example, an alert to the operator 212 of the crane 108 or an individual 110 may be provided for enabling collision avoidance therebetween.

In various embodiments, the crane guidance optimization and safety monitoring system 400 includes the database 226 that stores information relating to the objects 204 or the facility 200, such as the size, shape, weight, etc. of the objects and the size or other characteristics (e.g., known landmarks) of the facility 200. In one embodiment, the contents of the database 226 are used in combination with the received location information to provide the planned or changed guidance and the safety monitoring. It should be noted that the data within the database 226 may be downloaded during initiation of a travel or monitoring session across a communication link into a memory 404 (which may form part of one or more of the components shown in FIG. 4). In another embodiment, a copy of the data in the database 226 may be provided and maintained in a central computer system (not shown) that may be accessible by the controller 220. In yet another embodiment, the data in the database 226 (or portions thereof) may be updated during the travel or monitoring session from the central computer system.

In operation, the crane guidance optimization and safety monitoring system 400 is configured to provide dynamic guidance information and alerts based on location information as described herein. The alerts, which may be different types of warning(s) reduce the likelihood of collisions within the facility 200 that might otherwise result from the limitations of the individuals 110 to properly assess the potential for impact with the object 106, 202, which may be further reduced by a preplanned travel route (or path) as described herein.

Thus, the object guidance and collision avoidance system 100, which may be embodied as a crane guidance optimization and safety monitoring system 400 is configured to define a travel route that reduces the likelihood of possible collisions and also determines possible collision conditions, which may include the collision between the object 106, 202 being moved and the individual 110 or other objects 120, 202, 204 that are not in line-of-sight of each other. In one or more embodiments, the object guidance and collision avoidance system 100 processes received location information and different factors, such as position information, direction of travel information, location information and object specific information to determine guidance information and potential collision locations. For example, in various embodiments, the object guidance and collision avoidance system 100 is configured to provide a "smart" crane 108 that includes a real-time warning system with the ability to alert individuals outside of scenarios that are not in the line-of-site, the ability to sense and anticipate potential collisions, the ability to notify imminent danger and the ability to illuminate potentially dangerous areas on factory/warehouse floors.

In one embodiment, the object guidance and collision avoidance system 100 is configured to determine the quickest and/or safest route for moving the object 106, 202 based on location information (which may be continuously or periodically updated using information from the positions sensors 114) and object specific information (e.g., the footprint of the object, including the dimensions of the object). By using the object guidance and collision avoidance system 100, the object 106, 202 may be moved at a safer distance and height within the facility 200. For example, by using timestamp information of the location of different objects 120, 202, 204 and individuals 110, in combination with the location of the crane 108 as described herein, safe and efficient movement of the object 106, 202 can be provided.

It should be noted that the number and positioning of the location sensors 114 (e.g., RFID tags) may be varied as desired or needed. For example, the number and positioning of the location sensors may be changed based on a desired or required accuracy of location information. In some embodiments, the location sensors 114 may be used to provide information that allows for triangulating to a particular determined location. By using RFID tags as the location sensors 114 in various embodiments, different types of object information may be encoded that are specific to the object or crane (e.g., size, weight, maximum speed, etc.).

The object guidance and collision avoidance system 100 may use one or more location determination algorithms and path planning in background operations to determine or change the travel route/path for the object 106, 202 based on a time that the object 106, 202 is to be moved and object and facility information, which may include location information that may be quickly determined or calculated using information received from the location sensors 114 (e.g., RFID location information). In operation, the object guidance and collision avoidance system 100 may use a path planning algorithm to define one or more allowed paths for movement of the object 106, 202 in the facility 200, which may be different for different sized objects 106, 202. For example, in some embodiments, a matrix may be defined based on determined location information to determine whether the object 106, 202 can continue to move on the current route/path or if a stopping of movement or change in direction is needed. In some embodiments, the movement of the object 106, 202 may be stopped (e.g., emergency stop) or changed based on the real-time location information that is received.

In various embodiments, the object guidance and collision avoidance system 100 is configured to use heuristic or linear optimization to plan or change the travel route/path for the object 106, 202, such as to define different acceptable routes/paths. In some embodiments, the different routes/paths may be simulated prior to actual movement of the object 106, 202 to improve the route planning and object avoidance.

In some embodiments, environmental sampling, which may include receiving position information from continuous sensor readings, continuous GPS readings and computations and/or object recognition is provided. The controller 220 of the object guidance and collision avoidance system 100 may be programmed with a control algorithm that senses the physical location (e.g., three-dimensional location) in proximity to the objects and determines optimized travel routes/paths and potential collisions using one or more collision threshold algorithms. Based on the determined potential collisions, the travel route/path can be changed and/or one or more notifications are provided, such as light, sound and/or tactile/vibration notifications, among others.

It should be noted that the object guidance and collision avoidance system 100 may be configured in a combination of different hardware and/or software. Additionally, the database 226 may include an object library that provides for quick lookup of object specific information. In some embodiment, the database 226 includes one or more travel route or travel path libraries that define one or possible routes or paths that the object can be moved to reduce or eliminate the likelihood of collisions or that would have a lesser likelihood of encountering other objects or individuals, as well as provide more rapid movement of the object.

In some embodiments, one or more different inputs and outputs are provided for use in the guidance planning and safety monitoring processes and by the systems described herein. For example, the object guidance and collision avoidance system 100 may receive as inputs, one or more of a Device ID, sensor inputs (samples) from the location sensors 114 and location information. The inputs may then be processed by the object guidance and collision avoidance system 100 as described herein. In some embodiments, the object guidance and collision avoidance system 100 computes proximity and anticipatory collision distance from the object 106 or individual 110 associated with location sensor 114 to another object 106 or individual 110 associated with another location sensor or the crane 108. It should be noted that a frequency of sensor sample may be changed, such as based on a warning condition.

It further should be noted that in various embodiments, the processing device 219, which may be a central server, runs the service or algorithms to provide the guidance planning and safety monitoring to provide collision avoidance in real-time or near real-time. In various embodiments, a sensor feedback arrangement is provided that allows for real-time or dynamic guidance control and collision avoidance. For example, in one or more embodiments, the object guidance and collision avoidance system 100 performs route guidance, safety monitoring and/or collision avoidance by identifying/determining the location of objects and the crane over time, such as determining locations at time 1 and time 2 of the object 106, individuals 110 and other objects of interest and the crane 108, such as in a determined proximity, determining velocity information, determining a direction of travel information and a potential intersection region of one or more movable objects (e.g., from an intersection of one or more direction of travel projections), safe operating areas and generating an output signal to plan or change a travel route or path and/or provide an alert at the intersection region when at least one movable object is within a predetermined distance from the crane 108.

Figure 5:
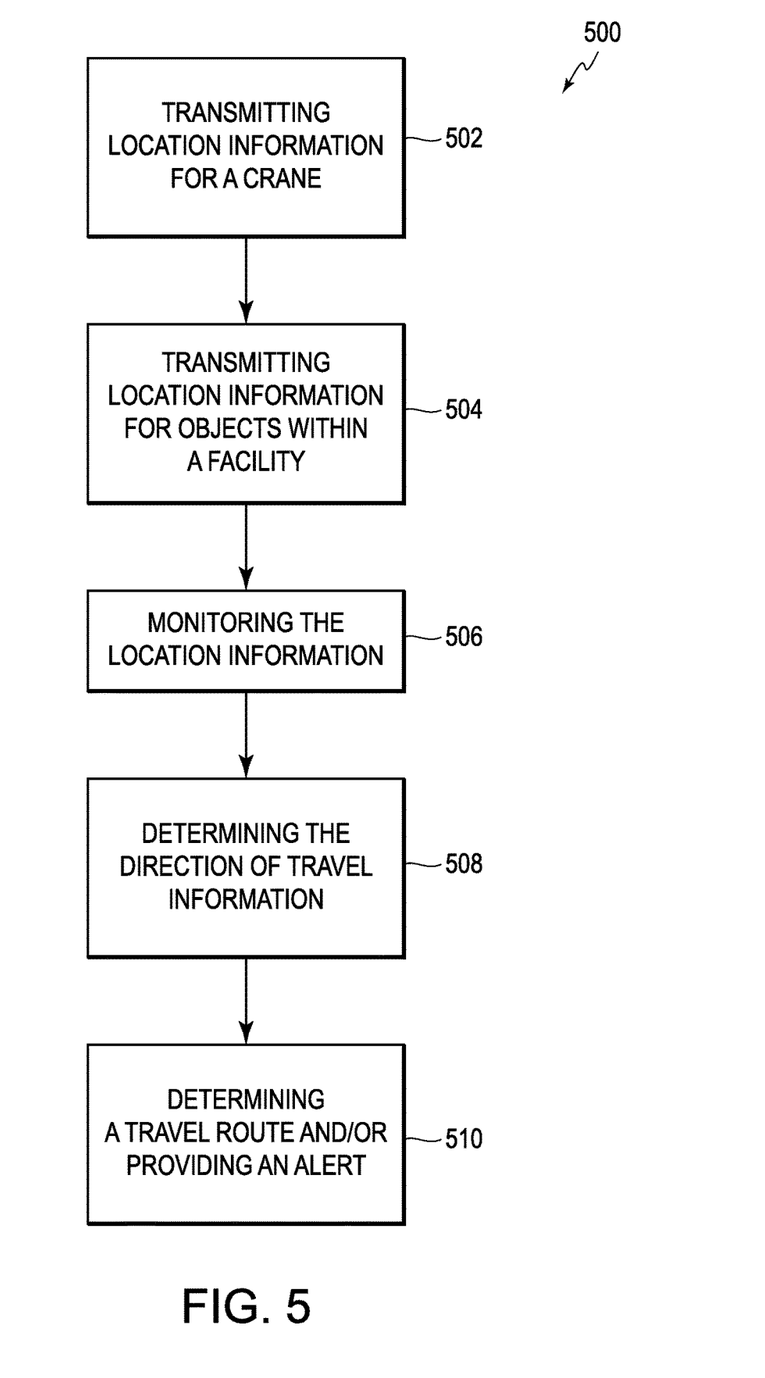
FIG. 5 is a block diagram of an object guidance and collision avoidance methodology.

Various embodiments provide a method 500 as shown in FIG. 5 for object guidance and collision avoidance between a plurality of movable objects in a facility. It should be noted that the method 500 may be implemented by or in connection with one or more system described herein. Additionally, the order in which the steps in the method 500 are performed may be changed and additional or fewer steps may be provided. Additionally, the steps in the method 500 may be performed simultaneously, concurrently or sequentially.

The method 500 includes transmitting at 502 location information, such as of a crane, for example from a location sensor disposed on a movable crane, which includes signals indicating a location of at least an end portion of the movable crane. The method 500 also includes transmitting at 504 location information for objects within a facility, via a plurality of sensors on the objects in the facility, which includes signals indicating or including the location of the objects, such as an elevated portion of the object on which each sensor is disposed. The method 500 also includes at 506, monitoring, via a controller, signals from the sensors (e.g., location sensors and/or proximity sensors), which monitoring may be performed continuously or periodically, and may change based on changing conditions.

The method 500 further includes at 508 determining direction of travel information, via the controller, such as a direction of travel of the movable crane and an intersection region of the direction of travel of the crane relative to at least one of the plurality of objects. The method 500 additionally includes at 510 determining a travel route or path and/or generating an output signal to an alarm device to provide an audible or visible alert, when at least one of the plurality of objects is within a predetermined proximity of at least the end portion of the movable crane, to thereby alert an operator for enabling collision avoidance with the at least one object.

Thus, various embodiments can provide a "smart" crane that moves an object based on a planned travel route or path, which may be dynamically changed based on received location information from within the facility.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 6:
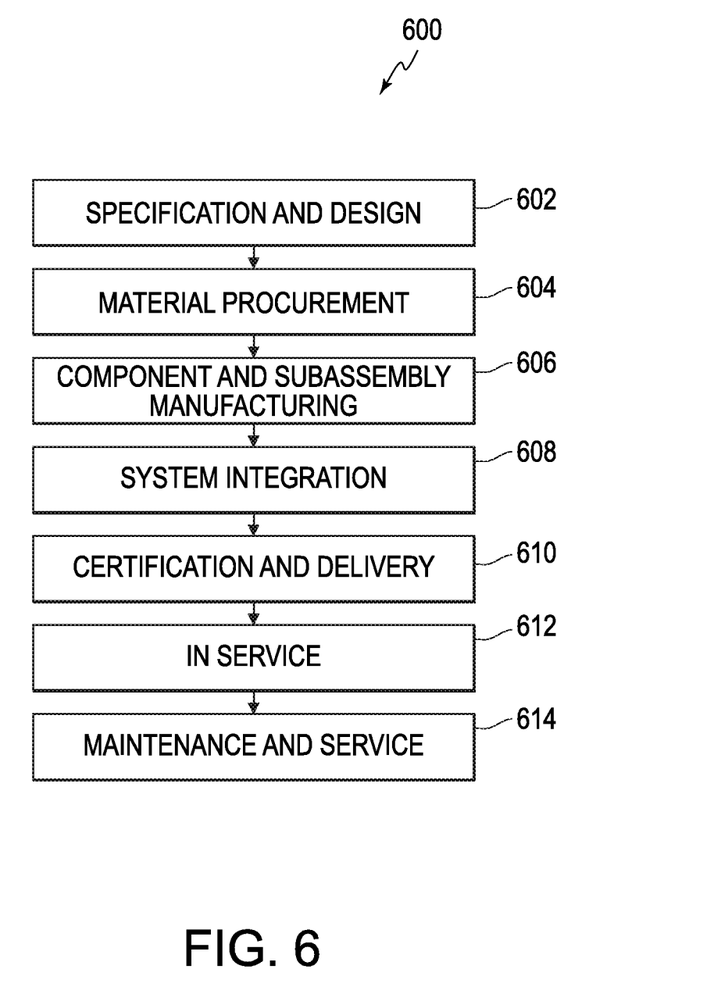
FIG. 6 is a block diagram of an aircraft production and service methodology.
Figure 7:
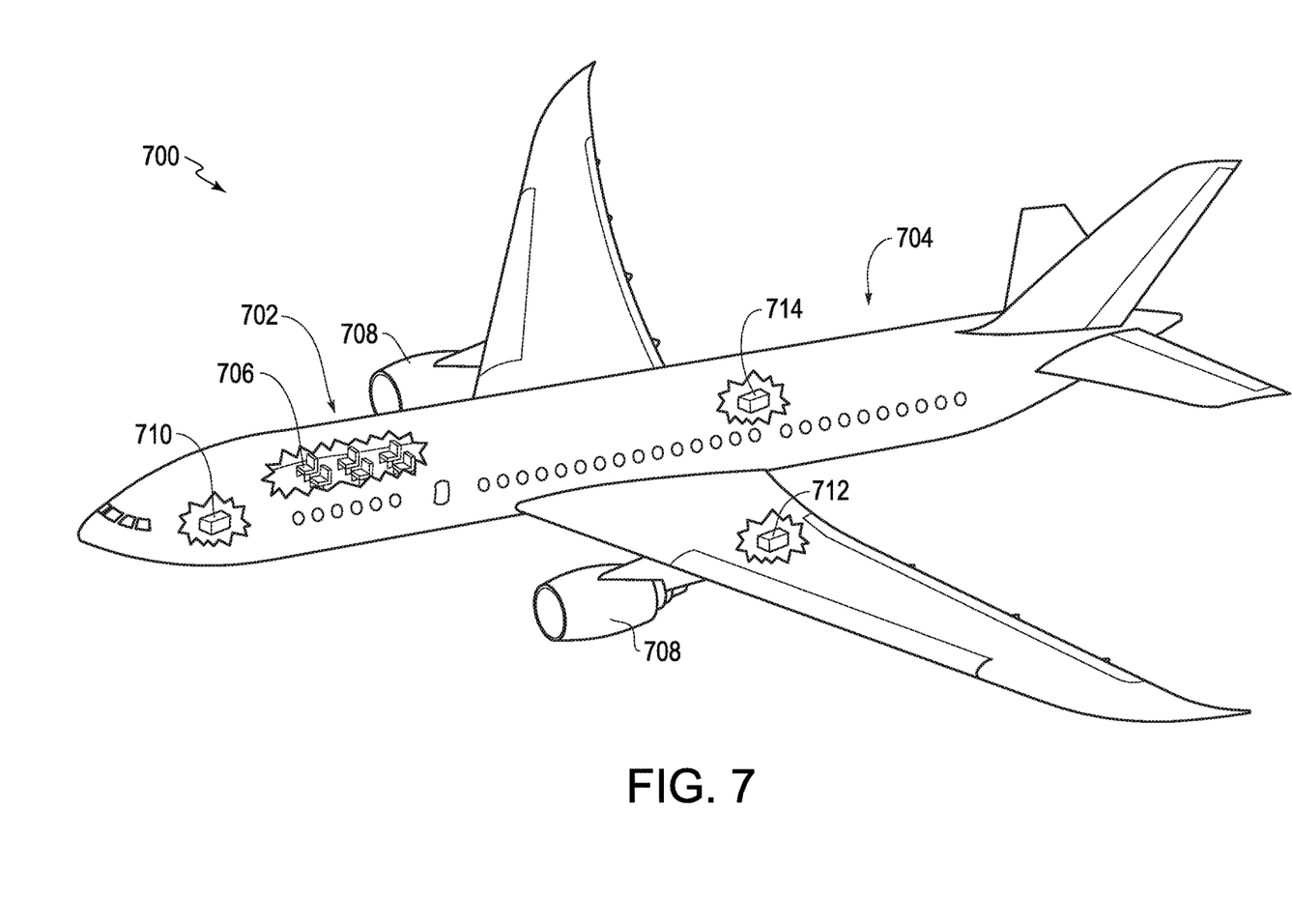
FIG. 7 is a schematic perspective view of an aircraft.

Examples of the disclosure may be described in the context of an aircraft manufacturing and service method 600 as shown in FIG. 6 and an aircraft 700 as shown in FIG. 7. During pre-production, illustrative method 600 may include specification and design 602 of the aircraft 700 and material procurement 604. During production, component and subassembly manufacturing 606 and system integration 608 of the aircraft 700 take place. Thereafter, the aircraft 700 may go through certification and delivery 610 to be placed in service 612. While in service by a customer, the aircraft 700 is scheduled for routine maintenance and service 614 (which may also include modification, reconfiguration, refurbishment, and so on).

Each of the processes of the illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 7, the aircraft 700 produced by the illustrative method 800 may include an airframe 702 with a plurality of high-level systems 704 and an interior 706. Examples of high-level systems 704 include one or more of a propulsion system 708, an electrical system 710, a hydraulic system 712, and an environmental system 714. Any number of other systems may be included. Although an aerospace example is shown, the principles may be applied to other industries, such as the automotive industry.

Apparatus and methods shown or described herein may be employed during any one or more of the stages of the manufacturing and service method 600. For example, components or subassemblies corresponding to component and subassembly manufacturing 606 may be fabricated or manufactured in a manner similar to components or subassemblies produced while the aircraft 700 is in service. Also, one or more aspects of the apparatus, method, or combination thereof may be utilized during the production states 606 and 608, for example, by substantially expediting assembly of or reducing the cost of an aircraft 700. Similarly, one or more aspects of the apparatus or method realizations, or a combination thereof, may be utilized, for example and without limitation, while the aircraft 700 is in service, e.g., maintenance and service 614.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for object guidance and collision avoidance, the system comprising:
    a location sensor configured to be disposed on a movable crane, and to transmit first location data indicating a location of a portion of the movable crane;
    a plurality of sensors configured to be disposed on a plurality of objects within a facility, wherein each sensor of the plurality of sensors is configured to transmit respective second location data that indicates a location of an object on which the sensor is disposed; and
    a controller including a receiver configured to receive the first location data from the location sensor and the second location data from the plurality of sensors while the movable crane is moving, the controller configured to determine, based on the first location data and the second location data, a first travel path of the movable crane and one or more intersection regions of the first travel path of the movable crane relative to a location of at least one object of the plurality of objects, and wherein the controller is further configured to:
        generate a second travel path for an item coupled to the movable crane, wherein the second travel path is selected from among a plurality of travel paths based on a speed criterion associated with the item and a safety criterion associated with the second travel path, wherein the second travel path is dynamically updated based further on third data specific to the item coupled to the movable crane, and wherein the third data indicates dimensions of the item; and
        generate an output signal to an alarm device responsive to at least one object of the plurality of objects being within a predetermined proximity of the item.

2. The system of claim 1, wherein an average speed of the item associated with movement along the second travel path is greater than average speeds associated with movement along other travel paths of the plurality of travel paths that are associated with safety values that satisfy the safety criterion.

3. The system of claim 1, wherein the controller is further configured to generate a matrix including dynamically updated first location data and to dynamically update the second travel path based on the dynamically updated first location data.

4. The system of claim 1, wherein the controller is further configured to generate one of an audible, visible or tactile alert.

5. The system of claim 1, wherein the plurality of sensors comprise radiofrequency identification (RFID) t tags, and wherein the receiver comprises an RFID reader.

6. The system of claim 1, further comprising a safety range sensor configured to be disposed on a hook of the movable crane, and to demarcate a safe operating radius around the hook.

7. The system of claim 1, further comprising a display configured to display the first travel path of the movable crane.

8. The system of claim 1, wherein the controller is configured to change the first travel path of the movable crane based on the one or more intersection regions that change based on a changed location of one or more of the objects of the plurality of objects within the facility.

9. The system of claim 1, wherein the controller is configured to stop movement of the movable crane based on a location of the movable crane in the one or more intersection regions.

10. The system of claim 1, wherein the controller is configured to determine direction of travel data of the movable crane relative to the plurality of objects.

11. The system of claim 1, further comprising a database defining object specific information, wherein the controller is configured to use the object specific information to generate the first travel path of the movable crane.

12. The system of claim 1, wherein the movable crane comprises an overhead crane in an aircraft manufacturing facility, and wherein the item comprises one or more parts used in the manufacture of an aircraft.

13. The system of claim 1, wherein a particular sensor of the plurality of sensors is configured to transmit signals including an end location of an end portion of the movable crane.

14. A method for object guidance and collision avoidance, the method comprising:
    monitoring, via a controller, first location data indicating a location of a portion of a movable crane moving an item- and second location data indicating a location of the item while the movable crane is moving;
    determining, via the controller, based on the first location data and based on the second location data, a first travel path of the movable crane and an intersection region of the first travel path of the movable crane relative to a location of at least one object of a plurality of objects located in a facility in which the movable crane is moving;
    generating a second travel path for the item, wherein the second travel path is selected from among a plurality of travel paths based on a speed criterion associated with the item and a safety criterion associated with the second travel path;
    generating via the controller a matrix including dynamically updated first location data;
    dynamically update the second travel path based on the dynamically updated first location data; and
    generating an output signal to an alarm device responsive to at least one of the plurality of objects being within a predetermined proximity of the item.

15. The method of claim 14, further comprising:
    receiving, at the controller from a location sensor positioned on the movable crane, the first location data; and
    receiving, at the controller from a plurality of sensors positioned on the plurality of objects, the second location data, wherein the plurality of sensors comprise radio frequency identification (RFID) tags.

16. The method of claim 14, further comprising changing the first travel path of the movable crane based on the intersection region that change based on a changed location of one or more objects of the plurality of objects.

17. The method of claim 14, further comprising stopping movement of the movable crane based on a location of the movable crane in the intersection region.

18. A smart overhead crane comprising:
   a hook for supporting an object to be moved within a facility, wherein a safety range sensor is coupled to the hook; and
   a controller having a receiver for monitoring signals transmitted from the safety range sensor and a plurality of location sensors disposed on a plurality of objects within the facility while the hook is moving, wherein the controller is configured to:
      generate a travel path for the hook to move the object based on location data generated at the plurality of location sensors, wherein the travel path is selected from among a plurality of travel paths based on a speed criterion associated with the object and a safety criterion associated with the travel path;
      generate a second travel path for an item coupled to the hook, wherein the second travel path is dynamically updated based further on third data specific to the item coupled to the hook, and wherein the third data indicates dimensions of the item; and
      generate an output signal to an alarm device to provide an alert, when at least one object of the plurality of objects is within a safety range of the hook as determined by the safety range sensor.

19. The smart overhead crane of claim 18, wherein a value corresponding to the speed criterion is maximized subject to the safety criterion.

20. The smart overhead crane of claim 18, wherein the safety range sensor comprises a photoelectric sensor.

* * * * *